United States Patent Office 3,798,333
Patented Mar. 19, 1974

3,798,333
PACKAGING BANANAS IN CARBON DIOXIDE PERMEABLE FILM
Alfred Samuel Cummin, Westfield, Henryk Daun, New Brunswick, and Seymour George Gilbert and Yair Henig, Piscataway, N.J., assignors to Borden, Inc.
No Drawing. Filed Mar. 31, 1972, Ser. No. 239,867
Int. Cl. B65b 25/04
U.S. Cl. 426—106        8 Claims

ABSTRACT OF THE DISCLOSURE

The ripening time of green bananas can be prolonged and the period of time they remain ripe can be extended by packaging the bananas in a film which has an oxygen permeability of 1,000 or more, a carbon dioxide permeability of 3,000 or more, and a ratio of carbon dioxide permeability to oxygen permeability of at least three.

BACKGROUND OF THE INVENTION

This invention is directed to packaging bananas in a film having a permeability to oxygen which matches the requirements of the bananas for oxygen and a permeability to carbon dioxide which matches the requirements of the bananas to expel carbon dioxide.

It is known that the storage life of bananas can be prolonged by controlling the atmosphere surrounding the bananas. Thus, bananas stored in holds of ships or in warehouses can be stored in atmospheres containing limited amounts of oxygen and increased carbon dioxide levels to prolong the storage life of the bananas. In order to keep oxygen and carbon dioxide on desired levels, continuous absorption of carbon dioxide and enrichment of oxygen is used with controlling equipment in hermetic systems. Another method of prolonging the storage life of bananas is to package the bananas when green without ethylene treatment in a polyethylene bag, and then when it is desired to ripen the bananas, open the bag and expose the bananas to a normal atmosphere. Another method for prolonging the storage life of bananas is to take the bananas when they begin to ripen and store them in polyethylene bags. This slows down the ripening process. The prior art is exemplified by U.S. Pat. 3,333,967 of Berg and U.S. Pats. 3,450,542 and 3,450,544 of Badran.

Some of the disadvantages of the prior art are: (1) if the bananas are packaged green, the package must be opened in order to ripen the bananas; (2) if the bananas are packaged when they begin to ripen, this requires storage while green and continuous inspection to determine when the ripening process begins; and (3) when a controlled atmosphere is used, such as in the hold of a ship or in a warehouse, the controlled atmosphere while quite suitable for bananas is not ideal for human life, rendering working in such an atmosphere impossible, unless cumbersome breathing apparatus is used.

SUMMARY OF THE INVENTION

Bananas are packaged as soon after picking as it is practicable in a film having a ratio of permeability of carbon dioxide to permeability of oxygen of at least three. The presence of carbon dioxide in the bananas package is undesirable as it promotes the formation of alcohols, aldehydes and acids. Prior to packaging, it is also preferred that the bananas, at least the stem end, be treated with bactericide or fungicide. This procedure allows the bananas to be packaged when picked, to be shipped while green, to ripen en route if desired, and to maintain their freshness and yellow appearance for a prolonged period while being in the local food store after they ripen in the package. From the time of packaging to the time the banana is consumed, it is preferred that the package not be opened. In addition to retarding the ripening and preserving the bananas in a ripe condition for a prolonged period, such as packaging technique prevents the spread of fungus, virus or bacteria among the various packages of the shipped bananas.

In a preferred embodiment, the bananas are gassed with ethylene prior to packaging to trigger the ripening process so that all of the bananas will ripen at about the same predetermined time.

DESCRIPTION OF THE PREFERRED EMBODIMENTS

Bananas can be packaged when green in a film having a permeability to oxygen of at least 1,000 and a permeability to carbon dioxide of at least 3,000 and a ratio of the permeabilites of carbon dioxide to oxygen of at least three. The ratio preferably has a value of about 4 to about 10. The film preferably has a permeability to oxygen of at least 2,000 and a permeability to carbon dioxide of at least 8,000. The upper limits of the permeabilities does not appear to be critical and is limited only by practical consideration in formulating the films. From a practical consideration, the upper limits for oxygen permeability is about 6,000 and for carbon dioxide permeability about 25,000.

The preferred method of packaging bananas involves laying about three to five bananas side by side on a flat, foamed polystyrene tray having low side walls. The tray is of the type normally used in meat packaging. The tray is then covered with a film having the desired permeability characteristics, depending upon the ripening time desired. It is preferable that the ratio of the surface area of the film per weight of bananas be from about 100 square inches to about 400 square inches per kilogram of bananas packaged; and most preferably, from 130 square inches to 250 square inches per kilogram of bananas.

Such a package slows down the ripening time of the bananas and allows them to be shipped long distances and stored for prolonged periods with delayed ripening. The bananas, when they ripen, at the supermarket or their ultimate destination, remain in a bright yellow state over a much longer period than a banana not so packaged. It is necessary that the film have a high permeability to carbon dioxide so as to allow a substantial portion of the carbon dioxide produced in the metabolism of the banana to escape from the package. A too high level of carbon dioxide in the package has an adverse effect on the taste of the bananas.

The bananas, from the time they are picked to the time they are consumed, have many of the attributes of being alive. They consume oxygen in their metabolism and give off carbon dioxide. The package described in the present invention allows the proper balance of oxygen and carbon dioxide to surround the bananas, to provide the desired ripening conditions. By this process, the bananas create the atmosphere which will provide them the maximum storage time.

As used above, all permeabilities are in cc. per 100 square inches per 24 hours at 23° C. per atmosphere. The permeabilities were run using a Linde Permeability Cell Model CS-135. This is a volumetric method for determining permeabilities and the results obtained are comparable to those obtained using the Method D-1434 outlined in ASTM Standards, Part 27, published July, 1971. The permeability values obtained are also comparable to those obtained using the Manometric Method outlined in the ASTM procedure found also in D-1434.

The preferred method of obtaining permeability data is the method developed by Professor Seymour Gilbert at Rutgers University. The procedure is set forth in an article written by him in the January 1969, issue of Package Engineering at pp. 66-69. The "Rutgers Cell" Method eliminates error due to pinholes in the films and error caused by the presence of water vapor.

The permeabilities used in the present application, however, were obtained using the Linde Cell in order to best compare them with the prior art and distinguish the present invention over what has been done previously.

In addition to being permeable to oxygen, carbon dioxide, it is also preferable that the films be permeable to ethylene. The bananas when they ripen give off ethylene. A high concentration of ethylene in the banana package is detrimental to the bananas. It is preferred that the ethylene content be maintained at a low level, preferably less than 30 p.p.m. The films, as above described, inherently allow sufficient ethylene to escape to maintain the proper low concentration of ethylene in the package.

A high permeability to ethylene of the film is also desirable when it is desired to ethylene-treat the bananas to trigger the ripening process while the bananas are packaged. This can be accomplished by surrounding the packaged bananas with ethylene gas either at atmospheric or super-atmospheric pressure. This can also be accomplished by injecting ethylene gas into the packages. In addition, the bananas can be treated with ethylene when green and then packaged. The ethylene treatment triggers the ripening process and provides a uniformity of ripening time. By selecting the proper permeabilities, the ripening time of the bananas can be adjusted to conform to the shipping time and with the shelf life time. It is preferred that the bananas be treated with ethylene, however, they may also be packaged when green without ethylene treatment. The bananas can also be treated with antifungals and bactericides prior to packaging. Such treatments are known in the art.

It is also preferred that the bananas be gassed within one week from the time they are picked and prior to packaging. The bananas, by the time they are picked, packaged, shipped out of the country of origin and arrive at their port of destination have been in the package for about two weeks and sometimes longer. The package containing the bananas is a valuable article of commerce in that the bananas are freer of infection than they would have been had they not been so packaged, will take longer to ripen, and will remain in a ripe condition much longer than bananas packaged by conventional means. The same is true of the banana package when it is three and four weeks old.

The bananas can be shipped in the same tray to the store at which they are sold to the buying housewife. The package provides, in addition to its prolonging the ripening time and protecting against infection, an attractive article to be placed on the sales shelf. The film is preferably transparent and the housewife can inspect the contents visually. The film also allows the bananas to remain in their most attractive deep yellow ripe condition while on the shelf of the store for a prolonged period.

Films which have been successfully employed in the practice of the present invention include film made from ethylene-vinyl acetate copolymer and film made from polyvinyl chloride and copolymers thereof.

The ethylene-vinyl acetate copolymer preferably contains at least 10 percent of vinyl acetate. The higher the polyvinyl acetate content, the higher the permeability of this film. The ethylene-vinyl acetate copolymer films are commercially available from Union Carbide and from U.S. Industrial Chemical Corp. The polyvinyl chloride films are the preferred films. The term polyvinyl chloride includes copolymers of polyvinyl chloride. For example, the polyvinyl chloride may also be a copolymer of polyvinyl chloride and polyvinyl acetate or mixtures of the homopolymers of the two. Other copolymers of polyvinyl chloride that can be used are the $C_1$ to $C_8$ alkyl esters of alpha-unsaturated aliphatic acids having three to five carbon atoms to the molecule of said acid. Examples of the alkyl esters include methyl, ethyl and octylacrylate and methacrylate. The copolymers and mixtures of the homopolymers provides satisfactory films for packaging bananas.

In its general application, a plasticizer is also present in the proportion of between about 20 to 60 parts by weight per 100 parts of vinyl polymer resin. Plasticizers which can be used in the formulation include di (2-ethylhexyl) adipate, di (2-ethylhexyl) phthalate, acetyl tributylcitrate, epoxidized soybean oil, butyl phthalyl butyl glycolate, di isobutyl adipate, diphenyl (2-ethylhexyl) phosphate, butyl benzyl phthalate, and the like and mixtures thereof. The total plasticizer concentration in the vinyl film should generally be between about 20–60 parts by weight of plasticizer for 100 parts by weight of vinyl film and preferably between about 30–50 parts.

Other additives to the film composition may include usual stabilizers for polyvinyl chloride film such as, for example, triphenyl phosphate, nonylphenol, barium, cadmium, calcium, and zinc salts of lauric and other fatty acids, and mixtures thereof.

An anti-fogging agent may also be present. The anti-fogging and anti-tackifying agent is a partial ester of water soluble polyols and aliphatic monocarboxylic acids (referred to as partial ester (1) and polyalkoxylated derivatives of a partial ester of water soluble polyols and aliphatic monocarboxylic acids (referred to as partial ester 2).

Partial ester 1 is a partial (such as monoester) of a water soluble $C_{2-6}$ polyol which polyol contains at least two alcohol groups. A minuimum of one of such alcohol groups are not reacted with acid to form the ester and at least one of such alcohol groups are reacted with acid to form the ester. The polyol component of this partial ester may be glycerol; ethylene, propylene or other $C_{2-4}$ glycols, trimethylol propane; sorbitol; and the like. The acid component may be any $C_{12-18}$ aliphatic monocarboxylic acid, examples of which are lauric, oleic, palmitic, stearic and the like acids.

Partial ester 2 is a polyalkoxylated derivative of a partial ester of a water soluble $C_{2-6}$ polyol which polyol contains at least two alcohol groups. A minimum of one of such alcohol groups are not reacted with acid to form the ester and at least one of such alcohol groups are reacted with acid to form the ester. The polyol component of this partial ester may be glycerol; ethylene, propylene or other $C_{2-4}$ glycols; trimethylol propane; sorbitol; sorbitan and the like. The acid component may be any $C_{12-18}$ aliphatic monocarboxylic acid, examples of which are lauric, palmitic, oleic, stearic and like acids. The alkoxylated groups of said partial ester 2 each have between about 2 to 3 carbon atoms, per repeating alkoxyl unit. The number of alkoxylated groups may be between about 3–30 per molecule of the alkoxylated partial ester. Illustrative examples are polyoxyethylene sorbitan monooleate, polyoxypropylene propylene glycol monooleate, polyoxybutylene trimethylol propane monooleate and the corresponding stearates, laurates, palmitates, etc., said partial esters having 5–25 alkoxylated groups to the molecule are usually preferred. The best results are generally obtained with polyoxyethylene sorbitan monooleate having about 20 oxyethylene groups to the molecule.

In order to impart antifogging properties to a vinyl film, both partial esters must be present in the composition. From the point of view of strictly antifogging properties in the film, 2 parts (about) by weight of each ester for 100 parts of polymeric vinyl resin will result in good non-fogging properties in a film or sheet made from said resin. However, when relatively high proportions of common plasticizers are included in the film formulation in order to obtain greater gas diffusion through the film, we prefer to have an excess of 2 parts and about at least 3 parts of partial ester 1 added to the film formulation in order to maintain the high level of anti-blocking properties of the film.

There may also be included food colors to establish the color desired.

Generally, the polymeric vinyl resin, plasticizer, etc., are heated and/or subjected to high shear and thus blended. When heat is used in blending, the temperature is such that it is sufficient to provide adequate penetration of the plasticizer and said agent into the vinyl resin. The solution is then extruded, drawn, blown or in any other convenient manner made into a film or sheet. The thickness of the film or sheet can be varied as desired, however, it has been found that a useful thickness for packaging bananas is between about .1 mil and 2 mils, preferably about 0.75 mil to 1.25 mils. Thickness greater than 2 mils may require additional plasticizer to attain the desired gas permeability rates.

In the following examples, as in the specification, all parts and percentages are by weight unless expressed otherwise, except for the percentages of oxygen and carbon dioxide in the packages. These are expressed in mol percentages or volume percentages.

EXAMPLE I

Green ethylene treated bananas were packed using the following procedure. Onto each of a number of flat, low walled, foamed polystyrene trays, each tray having a dimension of 7⅝ inches x 9⅝ inches, were laid three bananas. Each tray containing bananas was overwrapped tightly with a polyvinyl chloride film, having a thickness of 0.75 mil and then heat sealed at the bottom to provide a hermetic package. The polyvinyl chloride film used in this example had an oxygen permeability of 2,700, a carbon dioxide permeability of 17,000, and a ratio of carbon dioxide permeability to oxygen permeability of 6.3. The ethylene concentration was less than 10 p.p.m. The bananas were stored at 50° F. The oxygen level in the package during the storage period had an average value of 3.0. The average carbon dioxide concentration in each package during the storage period was 3.3.

At the end of 16 days, all of the bananas had ripened. They remained with a very good color, taste and texture over an additional 24 days. They had become over-ripe in texture and taste by the end of this period, but still retained the attractive yellow-ripe appearance by the 38th day after packaging.

EXAMPLE II

The procedure of Example I was repeated except that the polyvinyl chloride film was replaced by a film made from a copolymer containing 82% ethylene and 18% vinyl acetate. The film is commercially available from Union Carbide and U.S. Industrial Chemical Corp. The film had an oxygen permeability of 2,100, a carbon dioxide permeability of 8,400, and a ratio of carbon dioxide permeability to oxygen permeability of 4. The average percentage of oxygen in the package over the storage period was 4.4. The average concentration of carbon dioxide in the package over the storage period was 5.8. The average ethylene concentration was less than 10 p.p.m.

At the end of 16 days of storage, 100% of the bananas had ripened. After 22 days, the bananas were organoleptically evaluated and had a very good flavor and texture.

EXAMPLE III

The procedure of Example I was repeated except that a 0.75 mil film made from a copolymer containing 90% ethylene and 10% vinyl acetate was used. The film had an oxygen permeability of 1,900, a carbon dioxide permeability of 7,800, and a ratio of carbon dioxide permeability to oxygen permeability of 4.1. The film is commercially available from Union Carbide and U.S. Industrial Chemical Corp. The average oxygen concentration in the package was 8.3, and the average carbon dioxide concentration in the package was 6.0. The average ethylene content was less than 10 p.p.m.

The bananas so packaged had lost their deep yellow color and had turned yellow covered with dark spots, after 16 days. The bananas were organoleptically evaluated and had a very good taste and texture.

EXAMPLE IV

Example I was repeated except that the film had a thickness of 0.75 mil, a permeability to oxygen of 1,350, a permeability to carbon dioxide of 9,800, and a ratio of carbon dioxide permeability to oxygen permeability of 7.3. The average oxygen concentration in the packages was 2.0% and the average carbon dioxide concentration in the packages was 7.5%.

After 16 days, 10% of the bananas had ripened. They had all ripened after 30 days. The bananas which had ripened after 16 days had a fair to good flavor. Those bananas which remained in the package after 30 days had an off-flavor and an unusual odor.

EXAMPLE V

Example I was repeated except that the film had a thickness of 0.75 mil, a permeability to oxygen of 150, a permeability to carbon dioxide of 400, and a ratio of carbon dioxide permeability to oxygen permeability of 2.58. The average oxygen content in the packages during the storage period was 1.6%. The average carbon dioxide concentration in the packages was 31.7%. The bananas so packaged never ripened.

It will be understood that it is intended to cover all changes and modifications of the examples of the invention herein chosen for the purpose of illustration which do not constitute departures from the spirit and scope of the invention.

Having thus described our invention, what we desire to secure by Letters Patent of the United States is:

1. A method of packaging bananas in the green state consisting essentially of:
 (a) completely wrapping the green bananas in an imperforate gas permeable film having a permeability to oxygen of from about 2,000 to about 6,000 cc. per 100 square inches per 24 hours (at 23° C.) per atmosphere, and a permeability to carbon dioxide of 4 to 10 times as great as the permeability to oxygen with the further provision that the permeability to carbon dioxide be not less than 8,000 nor more than 25,000 cc. per 100 square inches per 24 hours (at 23° C.) per atmosphere;
 (b) sealing the film around the bananas so wrapped;
 (c) shipping the bananas in the sealed imperforate gas permeable film; and
 (d) allowing the bananas to ripen in the sealed imperforate gas permeable film.

2. The method of claim 1, wherein the film is a plasticized polyvinyl chloride film.

3. The method of claim 1, wherein the film is a plasticized polyvinyl chloride film having a thickness of about 0.75 mil to about 1.35 mils.

4. The method of claim 1, wherein the bananas have been treated with ethylene prior to packaging.

5. The method of claim 1, wherein the bananas are laid flat in a tray and completely wrapped in said imperforate gas permeable film.

6. A sealed banana package comprising in combination one or more bananas which are packaged in the green state, a single film surrounding the bananas; the film having a permeability to oxygen of from about 2,000 to about 6,000 cc. per 100 square inches per 24 hours (at 23° C.) per atmosphere, a permeability to carbon dioxide of from 4 to 10 times as great as the permeability to oxygen with the further provision that the permeability to carbon dioxide be not less than about 8,000 nor more than about 25,000 cc. per 100 square inches per 24 hours (at 23° C.) per atmosphere.

7. The package of claim 6, wherein the ratio of the surface area of the film per weight of bananas is from about 100 square inches to about 400 square inches per kilogram of bananas packaged.

8. The package of claim 6, wherein the ratio of the surface area of the film per weight of bananas is from about 130 square inches to about 250 square inches per kilogram of bananas packaged.

References Cited

UNITED STATES PATENTS

| | | | |
|---|---|---|---|
| 3,630,759 | 12/1971 | Rumberger | 99—171 LP |
| 3,289,386 | 12/1966 | Farmer | 53—28 |
| 3,234,028 | 2/1966 | Dunham, Jr. et al. | |
| 3,360,380 | 12/1967 | Bedrosian | 99—154 |
| 3,360,899 | 1/1968 | Kracht et al. | 53—30 |
| 3,450,544 | 6/1969 | Badran et al. | 99—171 R |
| 3,436,231 | 4/1969 | Bruce et al. | 99—154 X |
| 3,411,894 | 11/1968 | Lieberman et al. | 99—154 X |
| 3,639,318 | 2/1972 | Tijunelis et al. | 99—171 LP X |

OTHER REFERENCES

Modern Packaging Encyclo., McGraw-Hill, vol. 41, #7A, pp. 165, 185; vol. 44, #7A, p. 138.

FRANK W. LUTTER, Primary Examiner

S. L. WEINSTEIN, Assistant Examiner

U.S. Cl. X.R.

426—316, 396, 415